United States Patent
Yeap et al.

(10) Patent No.: US 8,762,726 B2
(45) Date of Patent: Jun. 24, 2014

(54) SYSTEM AND METHOD FOR SECURE ACCESS

(75) Inventors: Tet Hin Yeap, Ottawa (CA); Dafu Lou, Ottawa (CA); William G. O'Brien, Orleans (CA)

(73) Assignee: BCE Inc., Verdun, Quebec (CA)

( * ) Notice: Subject to any disclaimer, the term of this patent is extended or adjusted under 35 U.S.C. 154(b) by 545 days.

(21) Appl. No.: 13/052,565

(22) Filed: Mar. 21, 2011

(65) Prior Publication Data

US 2011/0170696 A1 Jul. 14, 2011

Related U.S. Application Data

(62) Division of application No. 10/673,509, filed on Sep. 30, 2003, now Pat. No. 7,930,412.

(51) Int. Cl.
*H04L 9/32* (2006.01)
*H04L 9/08* (2006.01)

(52) U.S. Cl.
USPC .............................. 713/170; 713/168; 380/278

(58) Field of Classification Search
USPC .................... 713/150, 153, 155, 168–171; 380/277–279, 282
See application file for complete search history.

(56) References Cited

U.S. PATENT DOCUMENTS

| | | | |
|---|---|---|---|
| 5,307,411 A | 4/1994 | Anvret et al. | |
| 5,586,260 A | 12/1996 | Hu | |
| 5,587,809 A | 12/1996 | Le Corre et al. | |
| 5,608,778 A | 3/1997 | Partridge, III | |
| 5,724,426 A | 3/1998 | Rosenow et al. | |
| 5,848,161 A | 12/1998 | Luneau et al. | |
| 5,953,422 A | 9/1999 | Angelo et al. | |
| 6,075,860 A | 6/2000 | Ketcham | |
| 6,178,244 B1 | 1/2001 | Takeda et al. | |
| 6,324,271 B1 | 11/2001 | Sawyer et al. | |
| 6,363,411 B1 | 3/2002 | Dugan et al. | |
| 6,363,421 B2 | 3/2002 | Barker et al. | |
| 6,714,983 B1 | 3/2004 | Koenck et al. | |
| 6,757,825 B1 | 6/2004 | MacKenzie et al. | |

(Continued)

FOREIGN PATENT DOCUMENTS

| | | |
|---|---|---|
| EP | 1 378 821 A2 | 7/2004 |
| GB | 2 384 406 A | 7/2003 |

(Continued)

OTHER PUBLICATIONS

Office Action issued by the Canadian Intellectual Property Office on Jul. 9, 2010 in connection with Canadian Patent Application Serial No. 2,571,814, 4 pages.

(Continued)

*Primary Examiner* — Darren B Schwartz (57) ABSTRACT

The present invention provides a method and system for secure access to computer equipment. An embodiment includes a secure access controller connected to a link between a transceiver (such as a modem) and the computer equipment. Public and private keys are used by the secure access controller and a remote user. The keys are provided to the secure access controller by an authentication server. Once the transceiver establishes a communication link with the user, the access controller uses these keys to authenticate packets issued by the user to the computer equipment. If the packet is authenticated, the access controller passes the packet to the computer equipment. Otherwise, the packet is discarded.

12 Claims, 5 Drawing Sheets

(56) References Cited

U.S. PATENT DOCUMENTS

| | | |
|---|---|---|
| 6,941,454 B1 | 9/2005 | Spraggs |
| 7,028,181 B1 | 4/2006 | McCullough et al. |
| 7,188,360 B2 | 3/2007 | Gerdes et al. |
| 7,296,149 B2 | 11/2007 | Hiltgen |
| 7,302,585 B1 | 11/2007 | Proudler et al. |
| 7,395,549 B1 | 7/2008 | Perlman et al. |
| 7,716,722 B2 | 5/2010 | Swift et al. |
| 7,774,602 B2 | 8/2010 | O'Brien et al. |
| 7,930,412 B2 | 4/2011 | Yeap et al. |
| 2001/0010724 A1 | 8/2001 | Murakami |
| 2001/0034717 A1 | 10/2001 | Whitworth |
| 2002/0004902 A1 | 1/2002 | Toh et al. |
| 2002/0078355 A1* | 6/2002 | Samar .................... 713/176 |
| 2002/0095573 A1 | 7/2002 | O'Brien |
| 2002/0147820 A1* | 10/2002 | Yokote .................... 709/229 |
| 2003/0012382 A1 | 1/2003 | Ferchichi et al. |
| 2003/0026433 A1 | 2/2003 | Matt |
| 2003/0056096 A1 | 3/2003 | Albert et al. |
| 2003/0074456 A1 | 4/2003 | Yeung et al. |
| 2003/0079143 A1* | 4/2003 | Mikel et al. ............. 713/200 |
| 2003/0093669 A1* | 5/2003 | Morais et al. ........... 713/163 |
| 2003/0095661 A1 | 5/2003 | Harrison |
| 2003/0115447 A1 | 6/2003 | Pham et al. |
| 2003/0115460 A1* | 6/2003 | Arai ........................ 713/168 |
| 2003/0147536 A1* | 8/2003 | Andivahis et al. ...... 380/277 |
| 2003/0163693 A1 | 8/2003 | Medvinsky |
| 2003/0216144 A1 | 11/2003 | Roese et al. |
| 2003/0221126 A1 | 11/2003 | Berman et al. |
| 2004/0025021 A1* | 2/2004 | Aikawa et al. .......... 713/172 |
| 2004/0034776 A1* | 2/2004 | Fernando et al. ....... 713/171 |
| 2004/0054794 A1 | 3/2004 | Lantto et al. |
| 2004/0062399 A1 | 4/2004 | Takase |
| 2004/0133908 A1 | 7/2004 | Smith et al. |
| 2004/0165727 A1* | 8/2004 | Moreh et al. ............ 380/278 |
| 2004/0179690 A1 | 9/2004 | Soliman |
| 2005/0071129 A1 | 3/2005 | Yeap et al. |
| 2005/0114697 A1 | 5/2005 | Cornell et al. |
| 2008/0044023 A1 | 2/2008 | Zorea et al. |
| 2010/0306529 A1 | 12/2010 | O'Brien et al. |

FOREIGN PATENT DOCUMENTS

| | | |
|---|---|---|
| JP | 2004056762 | 2/2004 |
| WO | WO 02/33884 A2 | 4/2002 |
| WO | WO 02/086718 A1 | 10/2002 |
| WO | WO 2004/032416 A1 | 4/2004 |

OTHER PUBLICATIONS

Office Action issued by the Canadian Intellectual Property Office on May 19, 2010 in connection with Canadian Patent Application Serial No. 2,540,590, 3 pages.

Network Security Private Communication in a Public World, Second Edition, Copyright 2002 by Prentice Hall, pp. 227-228.

Office Action issued by the United States Patent and Trademark Office on Aug. 18, 2009 in connection with U.S. Appl. No. 11/297,465, 22 pages.

Office Action issued by the United States Patent and Trademark Office on Jul. 2, 2007 in connection with U.S. Appl. No. 10/673,509, 9 pages.

Office Action issued by the United States Patent and Trademark Office on Jan. 10, 2008 in connection with U.S. Appl. No. 10/673,509, 9 pages.

Advisory Action issued by the United States Patent and Trademark Office on Mar. 28, 2008 in connection with U.S. Appl. No. 10/673,509, 3 pages.

Office Action issued by the United States Patent and Trademark Office on Feb. 3, 2009 in connection with U.S. Appl. No. 10/673,509, 10 pages.

Office Action issued by the United States Patent and Trademark Office on Aug. 18, 2009 in connection with U.S. Appl. No. 10/673,509, 5 pages.

Office Action issued by the United States Patent and Trademark Office on Feb. 22, 2010 in connection with U.S. Appl. No. 10/673,509, 8 pages.

Non-Final Office Action issued by the United States Patent and Trademark Office on Sep. 16, 2011 in connection with U.S. Appl. No. 12/851,809, 13 pages.

Notice of Allowance and Fee(s) Due issued by the United States Patent and Trademark Office on May 2, 2012 in connection with U.S. Appl. No. 12/851,809, 13 pages.

* cited by examiner

SYSTEM AND METHOD FOR SECURE ACCESS

CROSS-REFERENCE TO RELATED APPLICATION

This application is a DIVISIONAL, and claims the benefit under 35 U.S.C. §120, of U.S. patent application Ser. No. 10/673,509 to Yeap et al., filed on Sep. 30, 2003 now U.S. Pat No. 7,930,412, hereby incorporated by reference herein.

FIELD OF THE INVENTION

The present invention relates generally to computer security and more particularly to a system and method for secure access.

BACKGROUND OF THE INVENTION

Remote access to computer equipment is a rapidly developing trend. It is well known to access computer equipment over a dial-up connection using modems. It is becoming increasingly common to provide remote access via virtual private networks ("VPNs"), directly over digital subscriber line (DSL), cable and other types of high-speed internet links. Remote access can be used for a variety of useful purposes, such as enabling remote maintenance of computer equipment, without the problems associated with dispatching a maintenance person to the site of the computer equipment.

However, enabling remote access to computer equipment renders such equipment vulnerable to attacks from unauthorized persons who accidentally, or illegally, obtain the dial-up address of the computer equipment, and the passwords and other authentication information associated therewith.

The telecommunications industry is an industry with an interest in providing remote access to computer equipment resident at telephone exchange switches and used to operate the telephone exchange. However, the security vulnerabilities of prior art remote access methods has curtailed the development and deployment of remote access for telephone exchange switches.

One proposed means of providing remote access is described in U.S. Pat. No. 5,724,426 to Rosenow et al., which issued on Mar. 3, 1998. Rosenow discloses means for controlling access to computerized system resources to enable each new session to employ different encryption keys derived from multiple random numbers and multiple hidden algorithms without transmitting the keys across a communication line. Although Rosenow has merit, it is not entirely ideal for telephone exchange switches, because Rosenow relies on a central access control system that employs a dedicated parallel control network, such as a local area network ("LAN"), to centrally manage access control tables of an access-controlled system of resources.

Another proposed means for providing remote access is described in U.S. patent application Publication No. US2002/0095573 to O'Brien and published on Jul. 18, 2002. O'Brien describes an apparatus in which a secure access transceiver (i.e. modem) is provided for enforcing authenticated remote access to command controllable computer equipment. The secure access transceiver authenticates an entity seeking access to the computer equipment from a remote service point upon detection of a carrier signal during an initial handshake sequence. A data port on the secure access transceiver used to deliver data to the command controllable computer equipment is enabled only on authentication of the entity seeking access to the computer equipment and the data port is kept disabled otherwise, preventing data transfer through the secure access transceiver unless an authenticated connection is established. Although this system also has its place in certain applications, it does not provide an optimal solution for the need to enforce control over access to command controllable computer equipment because after a data port is enabled, and if protective measures have not been taken, the equipment is still vulnerable to attacks. Thus, an unauthorized user will have remote access to the command controllable computer equipment. In general, O'Brien assumes that the network providing the connection cannot be tampered with during the duration of the transaction after the initial authentication process.

Overall, the above-mentioned prior art to provide remote access to computer equipment is not suitable for certain applications.

SUMMARY OF THE INVENTION

It is an object of the present invention to provide a novel system and method for secure access that obviates or mitigates at least one of the above-identified disadvantages of the prior art.

According to an aspect of the invention, a secure access controller is provided for providing authenticated access to command controllable computer equipment. The secure access controller authenticates an entity seeking access to the computer equipment from a remote service point a data packet at a time upon establishing a link. A packet containing a command or data (or a portion thereof) received by the secure access controller from the transceiver is delivered to the command controllable computer equipment after it has been authenticated. Otherwise, the packet is discarded, thus reducing or preventing unauthorized access to the computer equipment via the secure access controller.

According to another aspect of the invention, a method of providing authenticated access to command controllable equipment connected to a secure access controller in response to a service access request is provided. An authentication process is performed for every packet upon establishing a link. As a part of the authentication process, authentication information is received from the remote point. Upon successful authentication, the packet is passed through the secure access controller to the computer equipment, and otherwise the data is discarded.

A method and apparatus for secure and authenticated access to command controllable computer equipment is described. The method involves using an access apparatus that prevents access to the command controllable computer equipment until a user is authenticated as a trusted user authorized to access the command controllable computer equipment. The apparatus may be a secure access controller connected to an access transceiver such as a voice band modem. The secure access controller will not pass the data command from a user to the command controllable computer equipment until a user is authenticated as a trusted user. The advantage is secure control of access to command controllable computer equipment that enables remote access to the equipment by authorized users with substantially reduced risk of compromise.

BRIEF DESCRIPTION OF THE DRAWINGS

The invention will now be described by way of example only, and with reference to the accompanying drawings, in which.

DETAILED DESCRIPTION OF THE INVENTION

Figure 1:
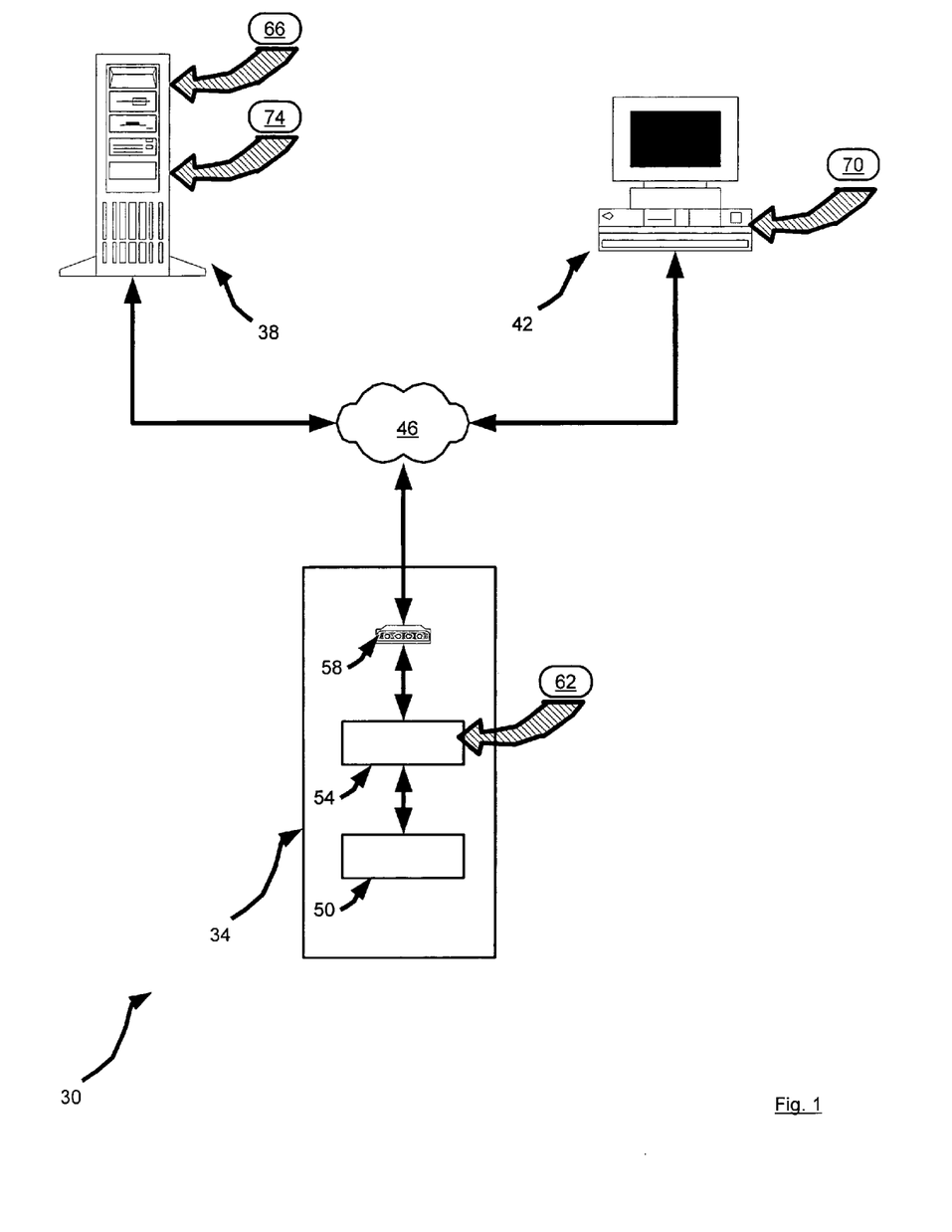
FIG. 1 is a block diagram of a system for secure access in accordance with an embodiment of the invention.

Referring now to FIG. 1, a system for secure access is indicated generally at 30. System 30 is comprised of at least one remote office 34, an authentication server 38 and at least one remote client 42, all interconnected by a network 46. The term "remote" is not to be construed in a limiting sense, and in a present embodiment refers to the different locations of office 34 and client 42 in relation to one or more other components in system 30, and/or to reflect the connection of office 34 and client 42 via network 46.

Remote office 34 is any facility that contains computer equipment that is to be accessed via network 46. In a present embodiment, remote office 34 is a telephone central office and the computer equipment contained therein is a telecommunications switch 50 as is commonly found in the public switched telephone network ("PSTN") that is operable to handle and manage a plurality of telephone connections. Remote office 34 also contains an access controller 54 that is connected to the switch 50. In turn, access controller 54 is connected to a network interface 58 that is complementary to the protocols employed over network 46, and accordingly, network interface 58 is operable to manage communications between network 46 and access controller 54. In a present embodiment, network 46 is the PSTN and network interface 58 is a voice-band modem, but in other embodiments, other types of networks and network interfaces can be employed.

Authentication server 38 is a computing device, (such as a personal computer, a server, or the like) that is typically comprised of hardware suitable for server type functions, and includes a central processing unit, random access memory, hard-disk storage and a network interface for communicating over network 46. As will be explained in greater detail below, authentication server 38 is operable to act as a trusted third party to assist in providing security in communications between client 42 and office 34. In a present embodiment, authentication server is operable to generate a public/private key pair for use in encrypting communications (or a portion thereof) between client 42 and office 34. Authentication server 38 will be described in greater detail below.

Remote client 42 is also a computing device, (such as a personal computer, laptop computer, personal digital assistant, or the like) that is typically comprised of hardware suitable for client-type functions, and includes a central processing unit, random access memory, a long term storage device and a network interface for communicating over network 46. Remote client 42 is operable to utilize the keys generated by authentication server 38 when conducting its communications with switch 50. It is to be understood that the term "client" encompasses a wide range of computing devices that are operable to interact with server 38 and office 34.

Access controller 54 within office 34 is operable to make use of the unique keys generated by authentication server 38 in order to authenticate whether communications with client 42 are authorized, and if so authorized, to pass such communications between switch 50 and client 42, and, if not authorized, to discard such communications. Access controller 54 is provided with a security database 62. When access controller 54 is originally manufactured, security database 62 includes a set-of factory preset containing data in accordance with Table I.

TABLE I

Security Database 62 of Access Controller 54 (Factory Preset)

| Field # | Field | Data |
|---|---|---|
| 1 | Phone Number | 5625800 |
| 2 | Identification Number | xy45678 |
| 3 | Access Controller's Private Key | acPRV(default) |
| 4 | Inactive Expiry Period | 5 days |
| 5 | Time to remain active after disconnect | 2 hours |
| 6 | Date of last change | 01/31/03 |
| 7 | Time of last disconnect | 23:59:59 |
| 8 | Power up counter | 001 |

Describing Table I in greater detail, Field 1, Phone Number, is the phone number on network 46 where network interface 58 can be reached. Generally, Field 1 remains fixed once access controller 58 is deployed in system 30. Field 2, Identification Number, is a unique identification number for access controller 54, and thus any additional access controllers 54 in system 30 would also have their own Identification Number. Generally, Field 2 remains fixed once access controller 58 is deployed in system 30. Field 3, Access Controller's Private Key, is a private key that can be used for encrypting communications with access controller 54 (and in turn switch 50) and thereby provide secure access to switch 50. As shown in Table I, access controller 54 is initially provided with a factory preset private key and is identified in Table I as "acPRV(default)". Thus, as will be explained in greater detail below, Field 3 will be updated from time to time in order to help provide ongoing secure access to switch 50.

Continuing with describing Table I in greater detail Field 4, Inactive Expiry Period is a time duration that can be used to terminate the validity of particular Access Controller Private Key, and thereby force an update of that key. Field 5, Time to Remain Active After Disconnect, is a period after which a remote client 42 disconnects from access controller 54 that a particular Access Controller Private Key remains valid, in the event that a particular remote client 42 wishes to reestablish communications within that time period after disconnecting from access controller 54. Field 6, Date of Last Change, is a date stamp of when the records in database 62 were last updated, and in particular, when Access Controller Private Key was last updated. Field 6 can be used by in conjunction with Field 4 to determine whether an update to Access Controller Private Key is to be performed. Field, 7, Time of Last Disconnect is a time stamp of when a particular remote client 42 last disconnected from access controller 54, to be used in conjunction with Field 5 to determine whether an update to Access Controller Private Key is to be performed.

Field 8, Power up counter, is a software counter in firmware of access controller 54 to count how many times access controller 54 has been shut-down and re-powered. An administrator that keeps separate track of the counter can monitor any tampering of access controller 54, in the event an unauthorized individual attempts to shut-down and then re-power the access controller 54. Additionally, the power up counter can be also set up to detect if access controller 54 has been disconnected, or put off-line from the remainder of system 30.

By the same token, authentication server 38 also includes an access controller database 66 that includes data that corresponds with the information stored in security database 62 (and also includes additional data that corresponds with information stored in security databases respective to any other access controllers that may be present in system 30). Those initial settings of access controller database 66 are shown in Table II.

Figure 2:
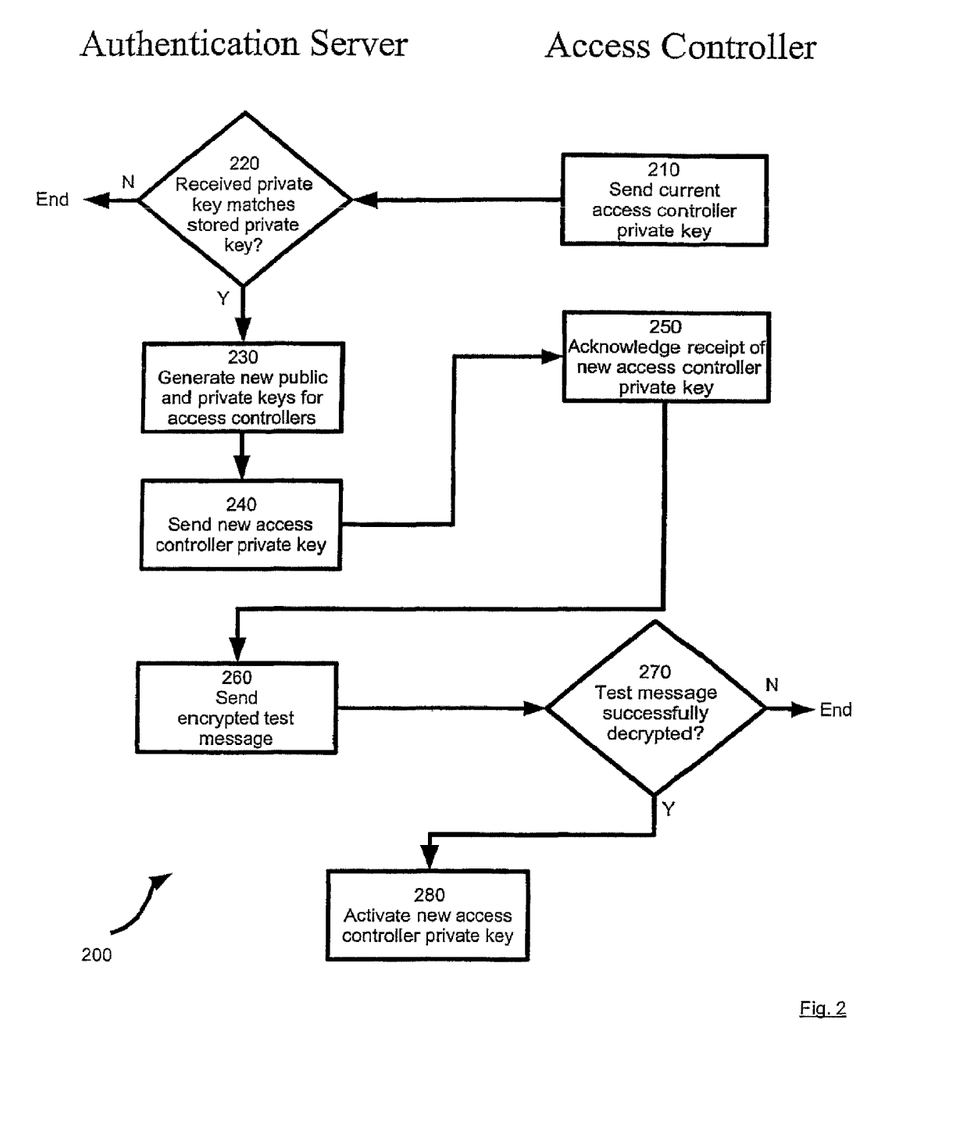
FIG. 2 is a flow chart showing a method of updating encryption keys for the access controller of FIG. 1 in accordance with another embodiment of the invention.

At step 230, a new public and private key pair for the access controller is generated. Thus, authentication server 38 will perform a predefined operation to generate a new access controller private key (represented herein as "acPRV(new)") and a new access controller public key (represented herein as "acPUB(new)").

At step 240, the new access controller private key generated at step 230 is sent to the access controller. The new access controller private key, acPRV(new), will thus be sent via network 46 back to access controller 54.

TABLE II

| | Security Database 66 of Authentication Server 38 | | | | | | |
|---|---|---|---|---|---|---|---|
| Record # | Field 1 Phone Number (Stores Field 1 of Table I) | Field 2 Identification Number (Stores Field 2 of Table I) | Field 3 Access Controller's Public Key | Field 4 Access Controller's Private Key (Stores Field 3 of Table I) | Field 5 Expiry Period (Stores Field 4 of Table I) | Field 6 Time to remain active after disconnect (Stores Field 5 of Table I) | Field 7 Power up counter (Stores Field 8 of Table I) |
| 1 | 5625800 | xy45678 | acPUB (default) | acPRV (default) | 5 days | 2 hours | 001 |

Table II shows one record, labelled Record 1, which reflects information corresponding to access controller 58. Thus, Fields 1, 2, 4, 5, 6 and 7 of Table II store the same information as Fields 1, 2, 3, 4, 5 and 8 of Table I, respectively. Table II also includes a Field 3, Access Controller's Public Key, which corresponds to the factory preset private key in Field 4, and is identified in Table II as "acPUB(default)". While not shown herein, Table II can also store additional records for any additional access controllers that are included in system 30.

Referring now to FIG. 2, a method for updating an access controller's encryption keys is indicated generally at 200. In order to assist in the explanation of the method, it will be assumed that method 200 is operated using system 30. Furthermore, the following discussion of method 200 will lead to further understanding of system 30 and its various components. (However, it is to be understood that system 30 and/or method 200 can be varied, and need not work exactly as discussed herein in conjunction with each other, and that such variations are within the scope of the present invention.)

At step 210, the current access controller private key is sent from the access controller to the authentication server. Thus, access controller 54 retrieves its Access Controller's Private Key, from its security database 62. Using the data listed in Table I as an example, the Access Controller's Private Key stored in access controller 54 is currently set to "acPRV (default)". The retrieved key is sent to authentication server 38 via network 46.

At step 220, it is determined whether the received access controller private key matches the stored access controller private key. Thus, authentication server 38, upon receipt of the key sent at step 210, will compare the received access controller private key with the access controller private key associated with access controller 50 by examining the contents of security database 66. If a match is found between the received access controller private key (i.e. "acPRV(default)") and the access controller private key stored Field 4 of Table II (i.e. "acPRV(default)"), then a match is found and method 200 will advance to step 230—otherwise method 200 ends due to a perceived security breach. Method 200 can begin anew in the event that such mismatch was merely a communications error.

At step 250, receipt of the new access controller private key is acknowledged. Thus, access controller 54, upon receipt of new access controller private key, acPRV(new) sent at step 240, will acknowledge such receipt to authentication server 38.

At step 260, an encrypted test message is sent. Authentication server 38 will prepare a known-test message, such as the text string "OK", and encrypt that message using new access controller public key, acPRV(pub), and send that encrypted test message to access controller 54.

At step 270, access controller 54 will attempt to decrypt the encrypted test message using new access controller private key, acPRV(new), and if the decryption is unsuccessful, the method will end, and at this point, it can be desired to start method 200 anew and re-attempt the update. If, however, the decryption is successful, and access controller 54 successfully recovers the known-test message (i.e. the text string "OK"), then the method advances to step 280.

At step 280, the new access controller private key is activated. Thusly, access controller 54 will update security database 62 to store new access controller private key with acPRV (new). Similarly, authentication server 38 will update its security database 66 to reflect both the new access controller private key and the new access controller public key. Table III shows the contents of security database 62 after the performance of step 280.

TABLE III

| Security Database 62 of Access Controller 54 | | |
|---|---|---|
| Field # | Field | Data |
| 1 | Phone Number | 5625800 |
| 2 | Identification Number | xy45678 |
| 3 | Access Controller's Private Key | acPRV(new) |
| 4 | Inactive Expiry Period | 5 days |
| 5 | Time to remain active after disconnect | 2 hours |
| 6 | Date of last change | 02/01/03 |
| 7 | Time of last disconnect | 23:59:59 |
| 8 | Power up counter | 001 |

In particular, note that in Table III, Field 3, Access Controller Private Key is updated to "acPRV(new)", while date of last change was changed from Jan. 31, 2003, to Feb. 1, 2003, assuming a hypothetical date of the performance of method 200 to be on Feb. 1, 2003.

Table IV shows the contents of security database 66 after the performance of step 280.

TABLE IV

Security Database 66 of Authentication Server 38

| Record # | Field 1 Phone Number (Stores Field 1 of Table I) | Field 2 Identification Number (Stores Field 2 of Table I) | Field 3 Access Controller's Public Key | Field 4 Access Controller's Private Key (Stores Field 3 of Table I) | Field 5 Expiry Period (Stores Field 4 of Table I) | Field 6 Time to remain active after disconnect (Stores Field 5 of Table I) | Field 7 Power up counter (Stores Field 8 of Table I) |
|---|---|---|---|---|---|---|---|
| 1 | 5625800 | xy45678 | acPUB (new) | acPRV (new) | 5 days | 2 hours | 001 |

In particular, note that in Table IV, Field 3, Access Controller Public Key is updated to "acPUB(new)", while Field 4, Access Controller Private Key is updated to "acPRV(new)".

At this point, method 200 terminates. Method 200 can be executed from time to time to update the access controller encryption keys and thereby enhance the overall security of system 30.

Other embodiments of the present invention provide means for making the access controller public key available to client 42 so that secure access between client 42 and switch 50 can be effected. Referring again to FIG. 1, client 42 thus also includes its own security database 70, which is mirrored by an additional security database 74 stored in authentication server 38.

When client 42 is originally configured, security database 70 appears in accordance with Table V.

TABLE V

Security Database 70 of Client 42

| Field # | Field | Data |
|---|---|---|
| 1 | Name | Joe Smith |
| 2 | UserID | 1234 |
| 3 | Password | b56789xx |
| 4 | Access Controller Identification Number | <Empty> |
| 5 | Access Controller Public Key | <Empty> |
| 6 | Remote Office Phone Number | <Empty> |

Describing Table V in greater detail, Field 1, Name, is the name of the particular user that owns or is in possession of client 42, and in this particular example is "Joe Smith". It is thus assumed that Joe Smith is an individual or employee who is intended to have access to switch 50. Generally, Field 1 remains fixed. Field 2, UserID, is a unique identifier assigned to Joe Smith, in this example, "1234". Similarly, Field 3, Password, is a second unique identifier assigned to Joe Smith, in this example, "b56789xx". UserID and Password are assigned to Joe Smith in any known manner as may be desired, and are typically provided to Joe Smith, in person, so that as the user of client 42 Joe Smith can populate Fields 2 and 3 of security database 70 through a user interface on client 42.

Continuing with describing Table V, Field 4, Access Controller Identification Number, and Field 5, Access Controller Public Key and Field 6, Remote Office Phone Number are initially blank, and client 42 is operable to communicate with authentication server 38 in order to populate those fields, as will be explained in greater detail below.

By the same token, security database 74 appears in authentication server 38 accordance with Table VI.

TABLE VI

Security Database 74 of Authentication Server 38

| Record # | Field 1 Name (Field 1 of Table V) | Field 2 User ID (Field 2 of Table V) | Field 3 Password (Field 3 of Table V) |
|---|---|---|---|
| 1 | Joe Smith | 1234 | b56789xx |

Table VI shows one record, labelled Record 1, which reflects information corresponding to the user of client 42. Thus, Fields 1, 2, and 3 of Table VI store the same information as Fields 1, 2, and 3, of Table V, respectively. While not shown herein, Table VI can also store additional records for any additional clients 42 that are included in system 30.

Figure 3:
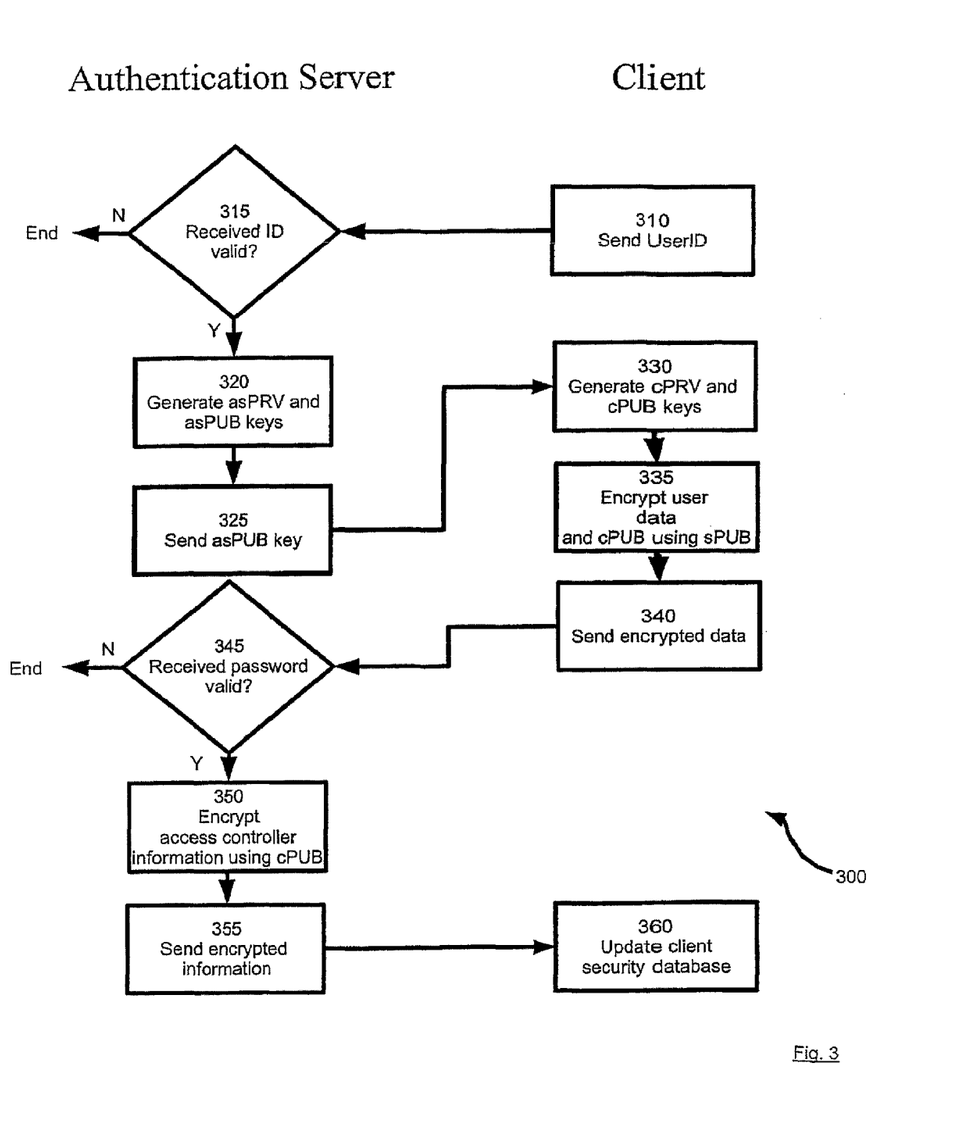
FIG. 3 is a flow chart showing a method of updating encryption keys for the client of FIG. 1 in accordance with another embodiment of the invention.

Referring now to FIG. 3, a method for updating a client security database is indicated generally at 300. In order to assist in the explanation of the method, it will be assumed that method 300 is operated using system 30. Furthermore, the following discussion of method 300 will lead to further understanding of system 30 and its various components. (However, it is to be understood that system 30 and/or method 300 can be varied, and need not work exactly as discussed herein in conjunction with each other, and that such variations are within the scope of the present invention.)

Beginning at step 310, the UserID of the user of client 42 is sent to authentication server 38. This is performed in system 30 via network 46, and when client 42 establishes a connection with authentication server 38, client 42 accesses security database 70, and sends the UserID "1234" over network 46 to authentication server 38.

Next, at step 315, authentication server 38 makes a determination as to whether this UserID is valid. To make such a determination, authentication server 38 accesses its security database 74 and looks for a corresponding UserID. If no valid corresponding UserID exists in database 74, the method ends. If such a valid UserID does exist, the method advances to step 320.

At step 320, authentication server 38 generates a one-time pair of private and public keys, identified herein as "asPRV" and "asPUB" respectively. At step 325, public key asPUB is sent over network 46 to client 42.

At step 330, client 42 will receive public key asPUB sent at step 325, and client 42 will generate its own one-time pair of private and public keys, identified herein as "cPRV" and "cPUB" respectively. At step 335, client 42 retrieves, from security database 70, the data contained in Fields 1-3 of Table V, namely, the Name, UserID and Password respective to that client 42. Also at step 335, the retrieved data is combined with public key cPUB, and the complete combination is encrypted using public key asPUB. At step 340, the encrypted combination of data is sent to authentication server 38 via network 46.

At step 345, authentication server 38 receives the data sent at step 340 and decrypts it using private key asPRV, and makes a determination as to whether the password it received is valid for client 42. Such a determination is made by ensuring that the received Name, UserID and Password correspond with the expected data found in security database 74. If it is not valid, then the method ends, however, if it is valid, then the method advances to step 350.

At steps 350 and 355, the access controller information needed by client 42 for secure access to remote office 34 is encrypted using public key cPUB and then sent to client 42. The access controller information is obtained by authentication server 38 which retrieves the relevant information from security database 66, which in the present example is Fields 1, 2 and 3 of Record 1 of Table IV, namely, the Phone Number (i.e. 5625800) of access controller 54, the Identification Number (i.e. xy45678) of access controller 54, and the Public Key of access controller 58 (i.e. acPUB(new)). This information is encrypted using public key cPUB, and then sent to client 42.

At step 360, client receives the encrypted information sent at step 355, and decrypts that information using private key cPRV, and updates database 70 with that decrypted information. Thus, once step 360 is performed, security database 70 appears in accordance with Table VII.

TABLE VII

Security Database 70 of Client 42

| Field # | Field | Data |
|---|---|---|
| 1 | Name | Joe Smith |
| 2 | UserID | 1234 |
| 3 | Password | b56789xx |
| 4 | Access Controller Identification Number | xy45678 |
| 5 | Access Controller Public Key | acPUB(new) |
| 6 | Remote Office Phone Number | 5625800 |

Figure 4:
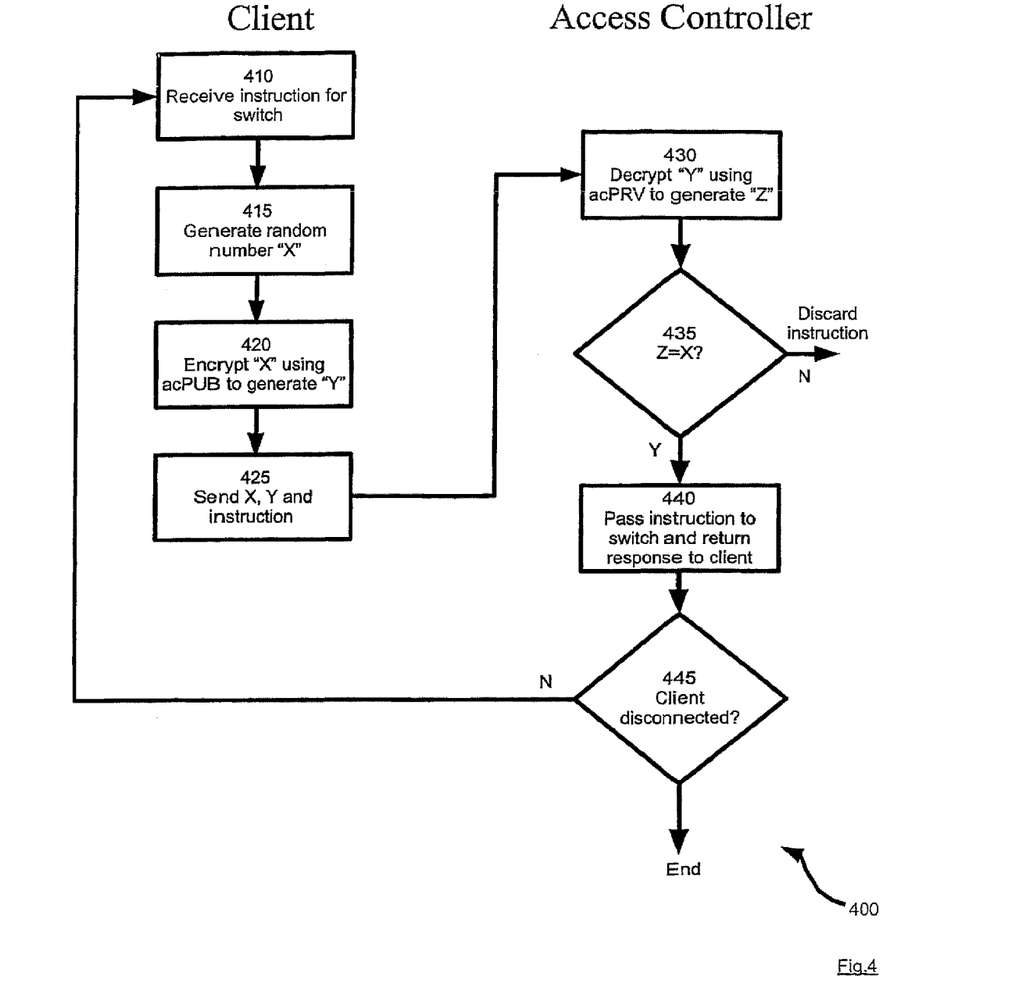
FIG. 4 is a flow chart showing a method for secure access in accordance with another embodiment of the invention.

Having so populated security database 70 using method 300, client 42 is now operable to securely access switch 50 in central office 34. Referring now to FIG. 4, a method for secure access is indicated generally at 400. In order to assist in the explanation of the method, it will be assumed that method 400 is operated using system 30. Furthermore, the following discussion of method 400 will lead to further understanding of system 30 and its various components. (However, it is to be understood that system 30 and/or method 400 can be varied, and need not work exactly as discussed herein in conjunction with each other, and that such variations are within the scope of the present invention.) Before discussing the method, it is assumed that methods 200 and 300 have been previously performed, and that client 42 has established communications with network interface 58 and access controller 54—client 42 having the phone number of office 34 and the identification number of access controller 54 available by retrieving such information from security database 70.

Beginning at step 410, client 42 receives an instruction destined for switch 50. Such an instruction can be any type of command, data, user-input, information or the like that is generated by client 42 and is destined for switch 50, as part of the function or task that is being performed by virtue of client 42 establishing a connection to office 34.

At step 415, client 42 generates a random number, referred to herein as "X". At step 420, random number "X" is encrypted using access controller public key acPUB(new), such key having been retrieved from security database 70. The encrypted version of random number "X" is referred to herein as "Y". At step 425, "X", "Y" and the instruction received at step 410 are sent to access controller 54 via network 46. The format in which this transmission occurs is not particularly limited, and can be in the form of a packet, a plurality of packets, a portion of a packet, as desired.

At step 430, access controller 54 decrypts "Y" that was sent at step 425, to generate "Z". Access controller 54 uses private key acPRV(new), such private key having been retrieved from security database 62.

At step 435, access controller 54 determines whether "X" matches "Z", "X" having been received directly from client 42, and "Z" having been generated at step 430. If no match is found, then the instruction is discarded due to a perceived breach in security. Method 400 can then begin anew to attempt to resend the lost instruction, or, access controller 54 can simply terminate method 400 and sever communications with client 42. However, if "Z"="X", then the method advances to step 440.

At step 440, the instruction destined for switch 50 is passed thereto by access controller 54, and any response generated by switch 50 is passed back to client 42 and processed by client 42 accordingly.

At step 445, it is determined whether client 42 has disconnected from network interface 58, and, if so, the method ends. If not, method 400 returns to step 410.

Figure 5:
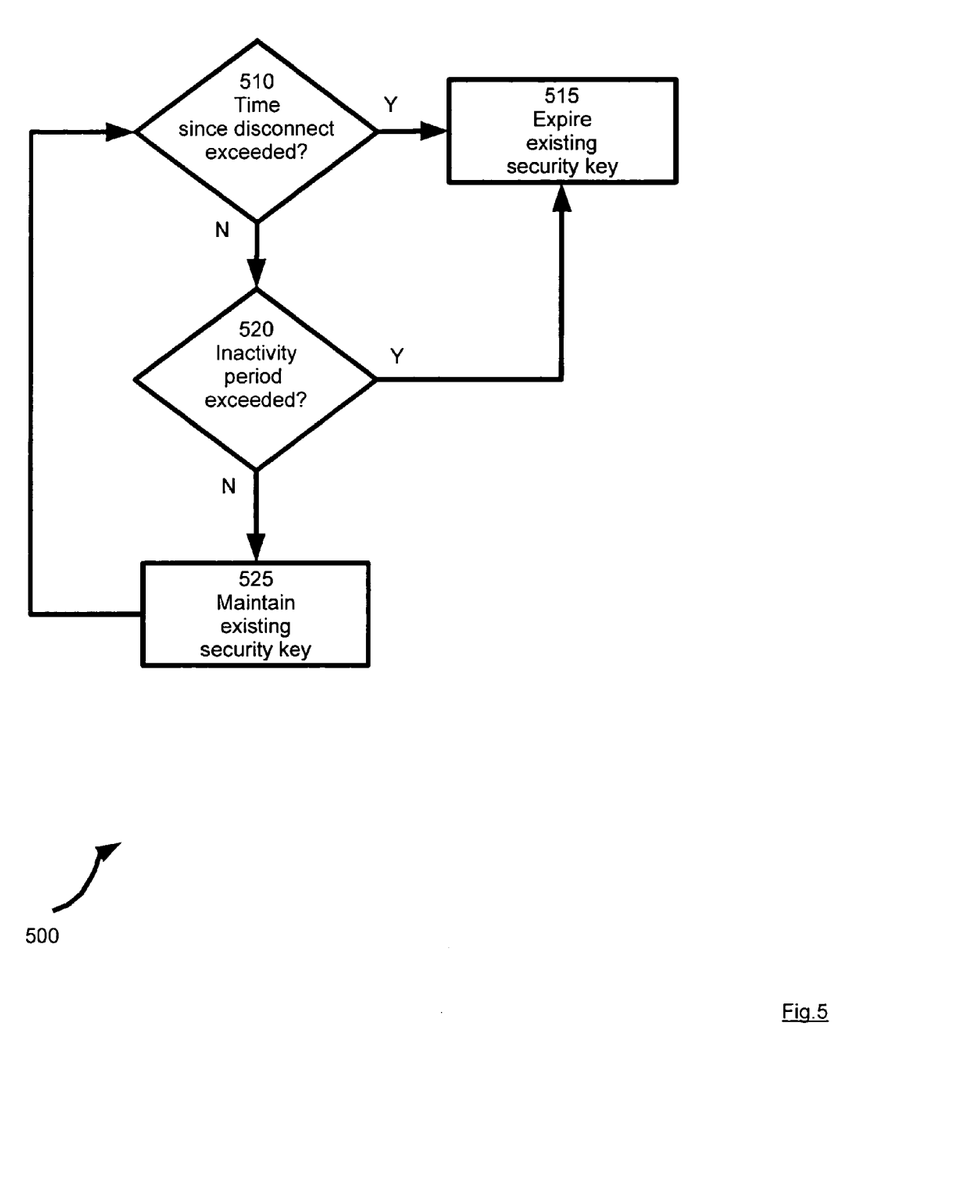
FIG. 5 is a flow chart showing a method of expiring encryption keys used in the system of FIG. 1 in accordance with another embodiment of the invention.

Referring now to FIG. 5, a method of expiring an access controller security key is indicated generally at 500. The execution of method 500 occurs in access controller 54, typically, after the execution of method 200 and during any period when there is no connection between client 42 and controller 54. At step 510, a determination is made as to whether the time since a disconnect between client 42 and controller 54 has been exceeded. For example, assuming method 400 has been conducted, but terminated, then the time since such termination is measured, and if the such time period exceeds the maximum prescribed period in security database 62 (such period being two hours per Field 5, Table III, "Time to remain active after disconnect") then the method will advance to step 515 and the access controller private key acPRV(new) will be deemed expired, and access controller 54 will need to execute method 200 to obtain another private key acPRV, and client 42 will then need to execute method 300 to obtain the corresponding public key acPUB. However, if the time period has not been exceeded, or method 400 has never been executed so no connection has ever actually been effected between client 42 and controller 54 since the last time controller 54 obtained a private key acPRV, then the method advances to step 520.

At step 520, a determination is made as to whether the time period during which no connection has been effected between client 42 and controller 54 has been exceeded. For example, assuming that method 400 has never been performed since access controller 54 executed method 200, if such time period exceeds the maximum prescribed period in security database 62 (such period being five days per Field 4, Table III, "Inactivity Expiry Period" then the method will advance to step 515 and the access controller private key acPRV(new) will be deemed expired, and access controller 54 will need to execute method 200 to obtain another private key acPRV, and then client 42 will then need to execute method 300 to obtain the corresponding public key acPUB. However, if the time period has not been exceeded, then the method returns to step 510.

It should be understood that method 500 is performed on an ongoing basis by access controller 54 any time that access controller 54 has executed method 200 and until a particular key has been expired at step 515. It should also be understood that, in variations on method 500, only one of step 510 or step 520 can be used, omitting the other step.

While only specific combinations of the various features and components of the present invention have been discussed herein, it will be apparent to those of skill in the art that desired subsets of the disclosed features and components and/or alternative combinations of these features and components can be utilized, as desired. For example, method 400 describes one particular way of utilizing the public key acPUB and private key acPRV to provide secure access to switch 50 from client 42, however, other utilizations of these keys can be effected to provide other means of providing secure communications between client 42 and switch 50. For example, it is contemplated that the actual instruction received at step 410 could simply be encrypted using public key acPUB, and decrypted by access controller 54 using private key acPRV before passing the same to switch 50.

Furthermore, it is also contemplated that access controller 54 can be incorporated directly into switch 50 (or such other computer equipment to embodiments of the present invention may be applied).

Furthermore, it should be understood that further encryption protocols can be employed. For example, method 300 can be modified so that the initial sending of the UserID of client 42 is delivered to authentication server 38 in an encrypted format. Such encryption can be performed using a variety of techniques, such as utilizing another set of private and public keys that are generated and updated from time-to-time by authentication server 38 and, such updates being provided to client 42 at the same time.

Furthermore, while system 30 was described in particular detail in relation to remote access of a central office telecommunication switch, it is to be reiterated that system 30 can be modified and applied to a very broad variety of applications where access to computer equipment is to be effected. For example, while system 30 included references to a network 46 that was described in relation to the PSTN, it is to be understood that network 46 can be any type of network that can carry communications between a client, such as client 42, and computer equipment, such as switch 50. Other types of networks can include local area networks, wide area networks, the internet, intranets, 802.11b (and its variants) wireless networks, Bluetooth wireless networks, GSM/GPRS wireless networks and the like—and in such variations of network 46, it will now be apparent that the corresponding interfaces respective to the client and the remote computer equipment being accessed by the client will thus correspond to the particular type of network.

In still further variations of system 30, it should be understood that network 46 can be eliminated (or at least simplified) and replaced with a simple RS-232, USB, infra-red or other type of direct connection between the client and the access controller that polices access to the computer equipment that the client is attempting to access. Thus, the execution of method 400 can be carried out by physically connecting client 42 to access controller 54 through an RS-232 or USB cable. By the same token, authentication server 38 can be physically located within central office 34 and thereby facilitate a direct connection between authentication server 38 and access controller 54. Other configurations of the components in system 30, and network configurations thereof, will now occur to those of skill in the art.

Regardless of the way by which client 42 is connected to switch 50 (or other type of computer equipment), it is to be understood that the way by which client 42 initiates communication with access controller 54 will be consistent with that type of connection or network interface. For example, where network 46 is the Internet, and interface 58 is a router having its own IP address, then client 42 will connect to access controller 54 using the IP address of that router, at which point method 400 can otherwise execute as described above. As a different example, during method 400 it can be desired to have server 38 carry communications between client 42 and access controller 54, acting as a proxy therebetween, and thereby obviate the need for client 42 to actually be aware of the telephone number of interface 58 (or IP address, depending on how interface 58 connected to server 38), and thereby providing additional security over the access to switch 50.

Also, it should now be apparent to those of skill in the art that other types of computer equipment (i.e. equipment other telecommunications switch 50) that are to be securely accessed by a client include mainframes, routers, bridges, hosts, file servers, print servers, mail servers, web servers, firewalls, and the like and that system 30 and the embodiments herein can be modified to provide secure access to those other types of computing equipment, and that such modifications are within the scope of the invention.

In another variant on the embodiments discussed in relation to system 30, it is to be understood that a variety of means can be used to create and maintain the various security databases of system 30. For example, system 30 can also include a Lightweight Directory Access Protocol ("LDAP") server (not shown in FIG. 1) that is accessible by server 38, client 42 and access controller 54. The LDAP server can be used to maintain and update a central repository of permissions for various users of client 42 (or additional clients added to system 30) who wish to access system 30. Thus, various portions of databases 62, 66, 70 and 74 relating to a particular user of client 42 can be built, and maintained from time to time, by accessing the LDAP server. Various security features can be built into the LDAP server, such as using digital certificates belonging to a particular user, can be utilized to enhance the security with which databases 62, 66, 70 and 74 are built and maintained. The LDAP server can also be made web-accessible, over a secure sockets layer (SSL) to a user of client 42, as a way of relaying and updating UserID and password data respective to that user. In this configuration, the LDAP server, and the access thereof by server 38, client 42, and access controller 54 would be effected on a regular basis to verify access of system 30. By the same token, the LDAP server itself would typically be subject to verification on a regular basis by another high authority.

The above-described embodiments of the invention are intended to be examples of the present invention and alterations and modifications may be effected thereto, by those of skill in the art, without departing from the scope of the invention which is defined solely by the claims appended hereto.

The invention claimed is:

1. A method, performed by an authorization server, of securing access between a client having temporary connection to a computer via an access controller, said access controller for selectively passing instructions received from said client to said computer if a verification protocol utilizing a set of keys is met, said method comprising:

receiving a request from said access controller for an updated first key;

authenticating said request;

determining said updated first key and a second key corresponding to said updated first key;

delivering said updated first key to said access controller; and wherein said verification protocol includes a generation of a random number by said client, an encryption of said random number by said client using said second key, a delivery of said random number and said encrypted random number from said client to said access controller, a decryption of said encrypted number using said updated first key by said access controller, a comparison of said random number and said decrypted number, and a decision to pass at least a portion of said instructions if said comparison finds a match of said random number with said decrypted number, and a decision not to pass said at least a portion of said instructions if no match is found.

2. The method according to claim 1, wherein determining said updated first key and said second key includes generating said updated first key and said second key.

3. The method according to claim 1, wherein said updated first key is a private encryption key and said second key is a public, encryption key complementary to said private encryption key.

4. The method according to claim 1, wherein a communication medium between at least one of said authentication server, said access controller and said client is selected from the group of networks consisting of the Internet, the PSTN, a local area network, and a wireless network.

5. The method according to claim 1, wherein said computer is a telecommunications switch.

6. The method according to claim 1, wherein said instructions are encrypted by said client using said second key and said verification protocol is based on a successful decryption of said instructions by said access controller using said updated first key.

7. The method according to claim 1, wherein said second key is delivered to said client only after said updated first key has been verified as having been successfully delivered to said access controller.

8. The method according to claim 1, wherein said second key is delivered to said client only if a user operating said client authenticates said user's identity with said authentication server.

9. The method according to claim 1, wherein said access controller contains a preset first key and said authentication server maintains a record of said preset first key said authentication server operable to deliver said updated first key and said second key only if said access controller successfully transmits said preset first key to said authentication server and said transmitted preset first key matches said authentication server's record thereof.

10. The method according to claim 1, wherein receiving a second request from said client for said second key; authenticating said second request; and delivering said second key to said client.

11. An authentication server for securing access between a client having temporary connection to a computer via an access controller, said access controller for selectively passing instructions received from said client to said computer if a verification protocol utilizing a set of keys is met, said authentication server comprising:

means for receiving a request from said access controller for an updated first key;

means for authenticating said request;

means for determining said updated first key and a second key corresponding to said updated first key;

means for delivering said updated first key to said access controller; and wherein said verification protocol includes a generation of a random number by said client, an encryption of said random number by said client using said second key, a delivery of said random number and said encrypted random number from said client to said access controller, a decryption of said encrypted number using said updated first key by said access controller, a comparison of said random number and said decrypted number, and a decision to pass at least a portion of said instructions if said comparison finds a match of said random number with said decrypted number, and a decision not to pass said at least a portion of said instructions if no match is found.

12. The authentication server of claim 11, wherein said means for determining said updated first key and said second key is operable to generate said updated first key and said second key.

* * * * *